United States Patent [19]

Tanaka

[11] Patent Number: 5,631,687
[45] Date of Patent: May 20, 1997

[54] LASER LIGHT RADIATION DEVICE PROVIDING REDUCED LASER LIGHT SPOT SIZE

[75] Inventor: Mamoru Tanaka, Yokohama, Japan

[73] Assignee: Canon Kabushiki Kaisha, Tokyo, Japan

[21] Appl. No.: 230,116

[22] Filed: Apr. 20, 1994

[30] Foreign Application Priority Data

Apr. 23, 1993 [JP] Japan ................................ 5-120806

[51] Int. Cl.⁶ ...................................................... B41J 2/415
[52] U.S. Cl. ............................................. 347/134; 347/256
[58] Field of Search .................................... 347/259, 256, 347/134, 260, 261; 359/205, 209

[56] References Cited

U.S. PATENT DOCUMENTS 4,268,871  5/1981  Kawamura .

Primary Examiner—Mark J. Reinhart
Attorney, Agent, or Firm—Robin, Blecker, Daley & Driscoll

[57] ABSTRACT

A laser light radiation device has a light source for emitting laser light which is modulated according to an image signal, a collimator lens for collimating the laser light emitted from the light source, and a polygonal mirror for deflecting the laser beam emerging from the collimator lens. The device further has a diffraction grating in a laser optical path between the collimator lens and the polygonal mirror.

9 Claims, 8 Drawing Sheets

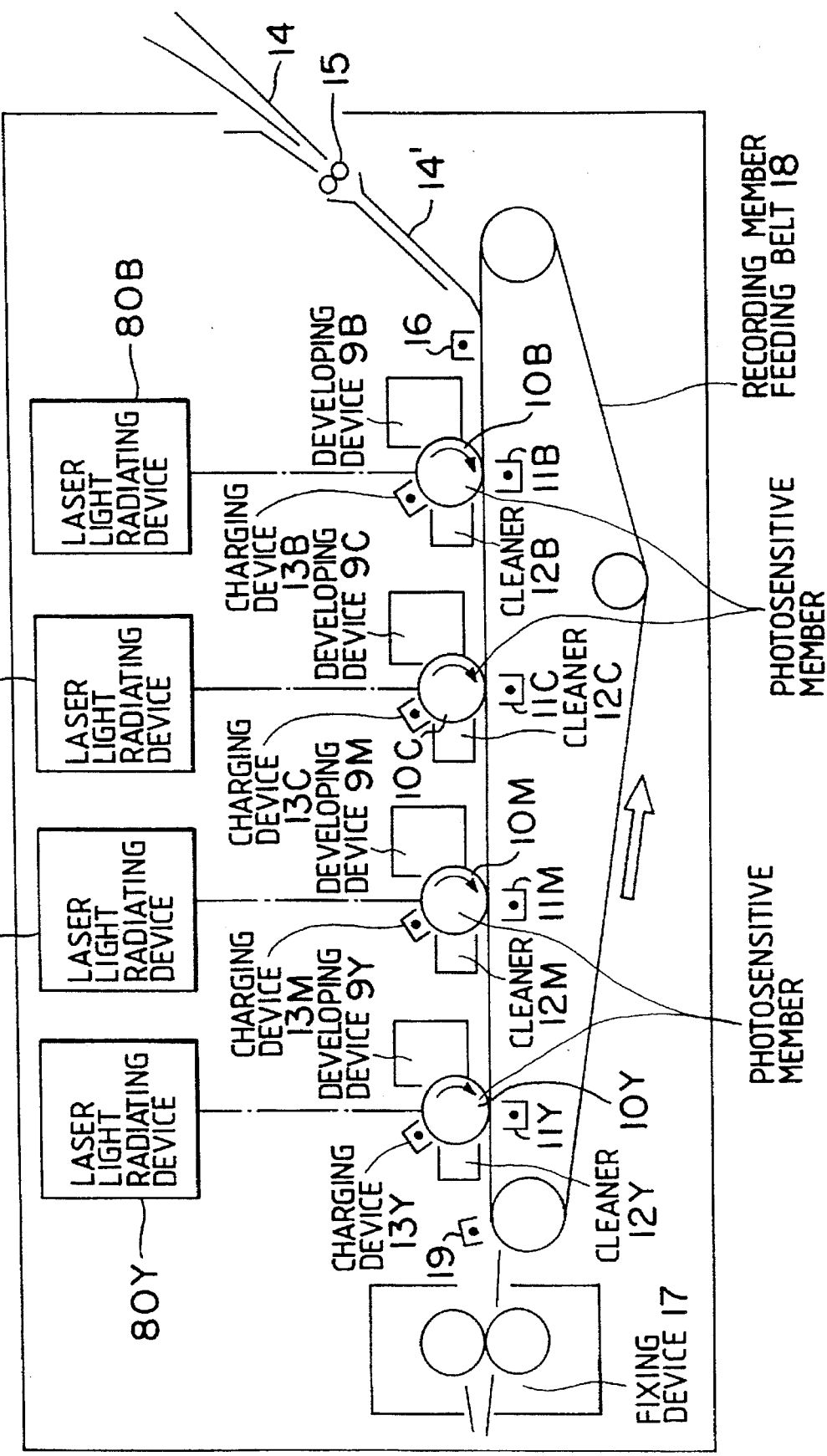

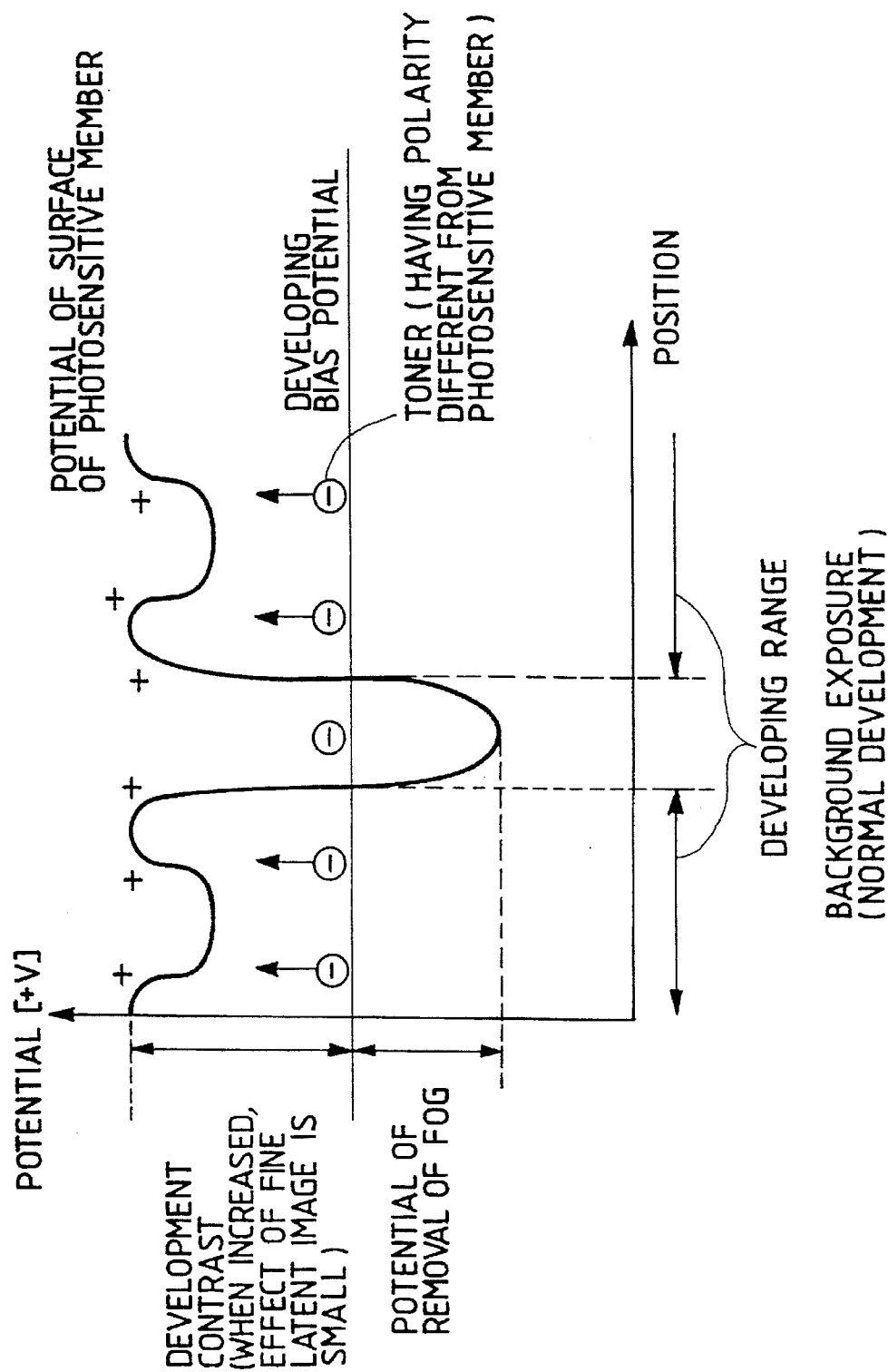

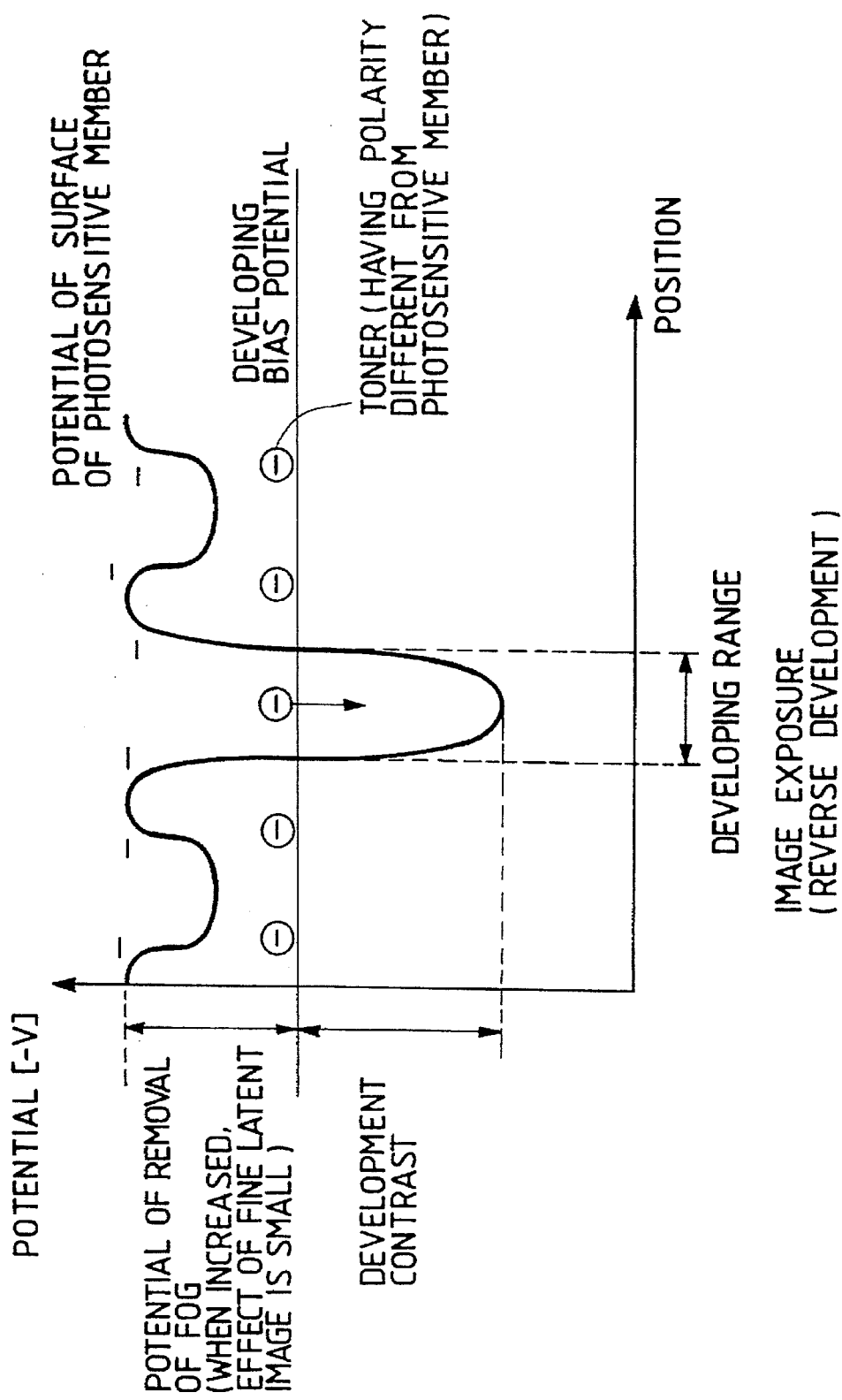

LASER LIGHT RADIATION DEVICE PROVIDING REDUCED LASER LIGHT SPOT SIZE

BACKGROUND OF THE INVENTION

1. Field of the Invention

The present invention relates to a laser light radiation device used in an image forming apparatus adopting an electrophotography process and, more particularly, to a laser light radiation device which is used in, e.g., a full-color printer, and has a light source for emitting laser light.

2. Related Background Art

In conventional image forming apparatuses, as a high-speed, low-noise printer, a laser beam printer which adopts an electrophotography process is known.

A typical application of the laser beam printer is binary recording for forming an image such as a character, a figure, or the like on a photosensitive member depending on the radiation/non-radiation state of a laser beam. In general, since recording of a character, figure, or the like does not require any halftone expression, the printer structure can be simplified.

However, even in such a binary recording method, demand has arisen for a printer which can achieve a halftone expression. As a method of achieving a halftone expression, a method adopting a dither method, a density pattern method, or the like is known. However, as is well known, a printer which adopts a dither method, a density pattern method, or the like cannot provide a high resolution. In recent years, a method of forming halftone pixels while maintaining a high resolution without decreasing the recording density has been proposed. This method is a PWM method for performing halftone pixel formation by modulating the pulse width of a laser beam to be radiated in accordance with an image signal. According to this PWM method, a high-resolution, multi-gradation level image can be formed, and hence, this method is indispensable for a color image forming apparatus which requires both the high resolution and multi-gradation level characteristics. More specifically, the PWM method can achieve area gradation of a dot formed by a beam spot in units of pixels, and a halftone expression can be realized without decreasing the pixel density (recording density) to be recorded.

FIG. 8 shows this prior art. FIG. 8 is a schematic view of a laser beam scanner portion. A laser drive circuit 101 is driven by a signal transmitted from an image information signal source (not shown) to scan the laser beam position by a laser beam scanner using a semiconductor laser unit 102, a collimator lens 103, a polygonal mirror 104, and an f-θ lens 105. Thus, a beam spot is focused on the surface of a photosensitive drum 110 as an image carrier to form an electrostatic latent image on the surface of the drum 110. Thereafter, image recording is realized on a recording sheet via a known electrophotography process.

As described above, with the PWM method, a high-resolution image can be formed.

However, since the PWM method reduces an image to be formed in one pixel by narrowing the pulse width, the amount of laser light to be radiated onto one pixel (laser intensity) becomes extremely small. Therefore, as the resolution becomes higher, a desired exposure amount cannot be obtained, and the density of an image decreases.

For this reason, the resolution of an image may be increased by reducing the spot size of a laser beam itself. However, the obtainable reduction in spot size is limited in a method of focusing the spot size using a lens.

SUMMARY OF THE INVENTION

The present invention has been made in consideration of the above-mentioned problems, and has as its object to provide a laser light radiation device which can reduce the spot size of laser light.

It is another object of the present invention to provide a laser light radiation device comprising a light source for emitting laser light which is modulated according to an image signal, a collimator lens for collimating the laser light emitted from the light source, and deflection means for deflecting the laser light emerging from the collimator lens, wherein a diffraction grating is arranged in a laser optical path between the collimator lens and the deflection means.

The above and other objects of the present invention will become apparent from a reading of the following detailed description taken in conjunction with the accompanying drawings.

BRIEF DESCRIPTION OF THE DRAWINGS

FIG. 6 is a schematic view showing an image forming apparatus of a multiple drum type, to which the laser light radiation device of the present invention can be applied;

FIGS. 7A and 7B are respectively graphs showing the relationships between image exposure (reverse development) and background exposure (normal development) in association with the development contrast potential and the potential of removal of fog, which can be applied to the present invention.

DETAILED DESCRIPTION OF THE PREFERRED EMBODIMENTS

The present invention will be described below with reference to its illustrated embodiments.

Figure 3:
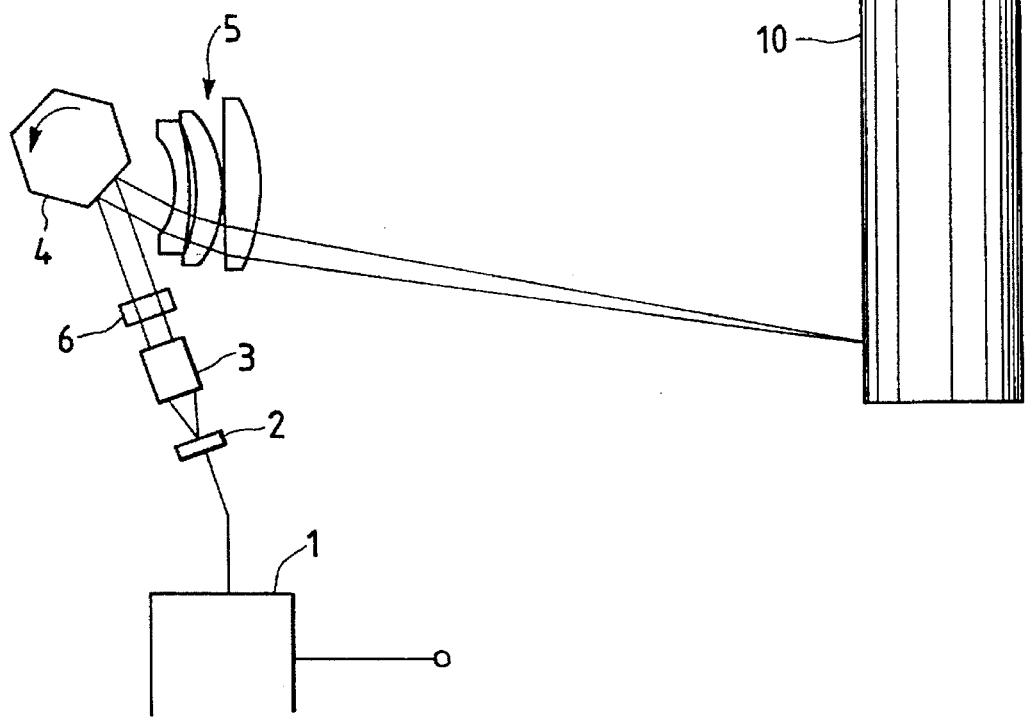
FIG. 3 is a schematic view showing an example of a laser light radiation device according to the present invention.
Figure 8:
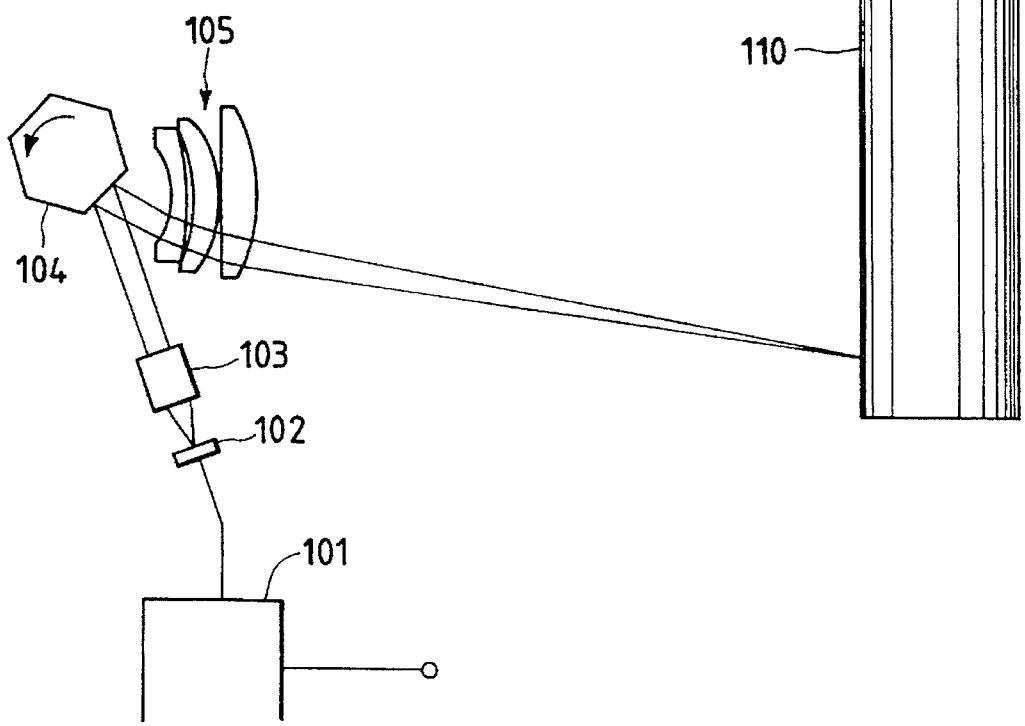
FIG. 8 is a schematic view showing an example of a conventional laser beam scanner unit.
Figure 4:
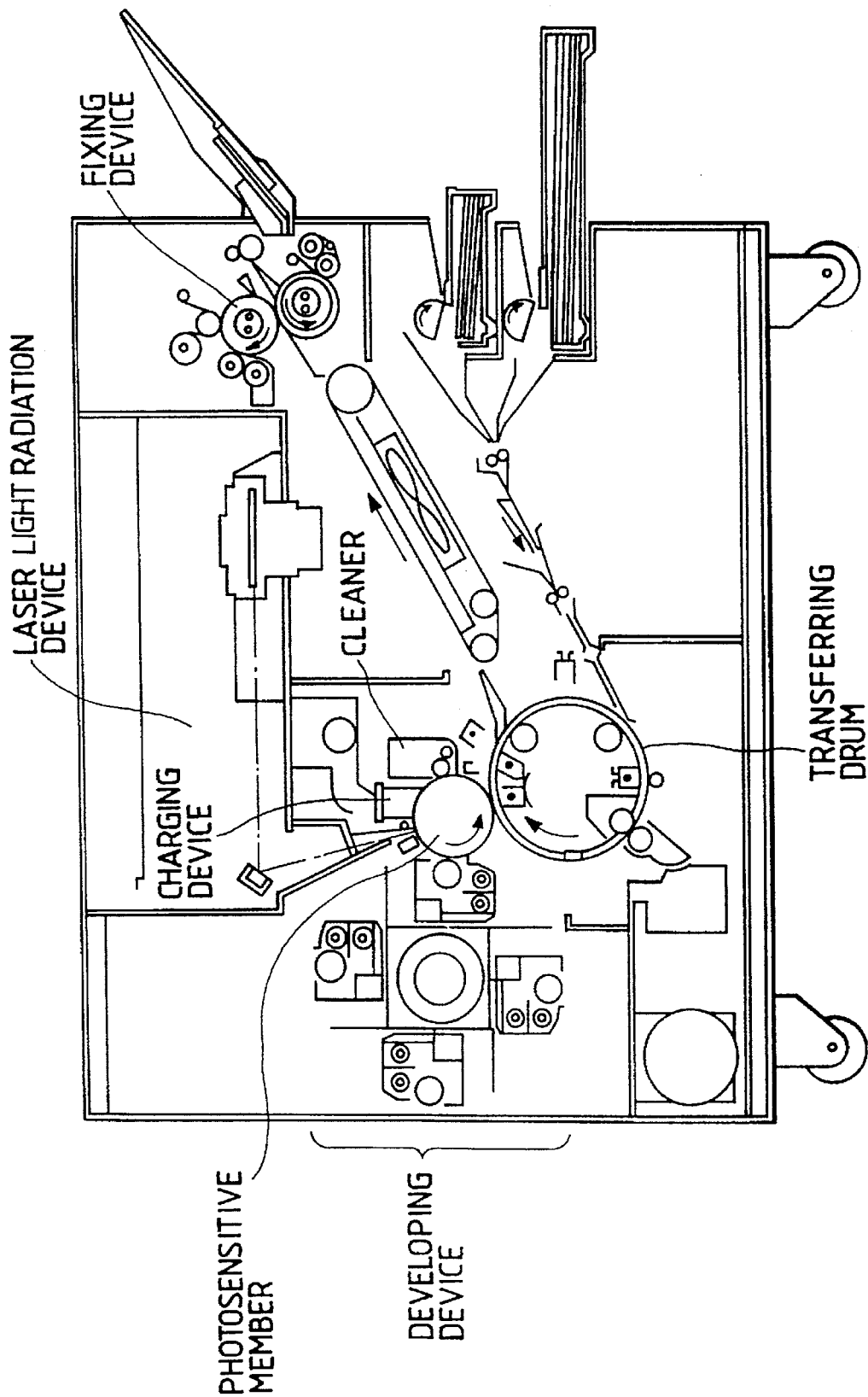
FIG. 4 is a schematic sectional view showing an image forming apparatus to which the laser light radiation device of the present invention is applied.

FIG. 4 is a schematic view showing the overall image forming apparatus to which a laser light radiation device of the present invention is applied, and FIG. 3 is a schematic view showing an example of a laser beam scanner unit shown in FIG. 4. A laser drive circuit 1 is driven by a signal transmitted from an image information signal source (not shown) to scan the laser beam position by a laser beam scanner using a semiconductor laser unit 2, a collimator lens 3, a diffraction grating 6, a polygonal mirror 4, and an f-θ lens 5. Thus, a beam spot is focused on the surface of a photosensitive drum 10 as an image carrier to form an electrostatic latent image on the surface of the drum 10. Thereafter, image recording is realized on a recording sheet via a known electrophotography process.

Figure 2A:
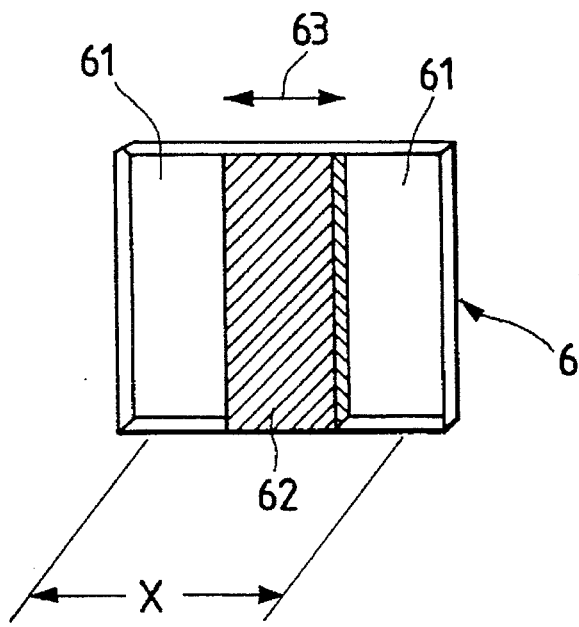
FIG. 2A is a perspective view of a diffraction grating 6 used in the embodiment of the present invention.
Figure 2B:
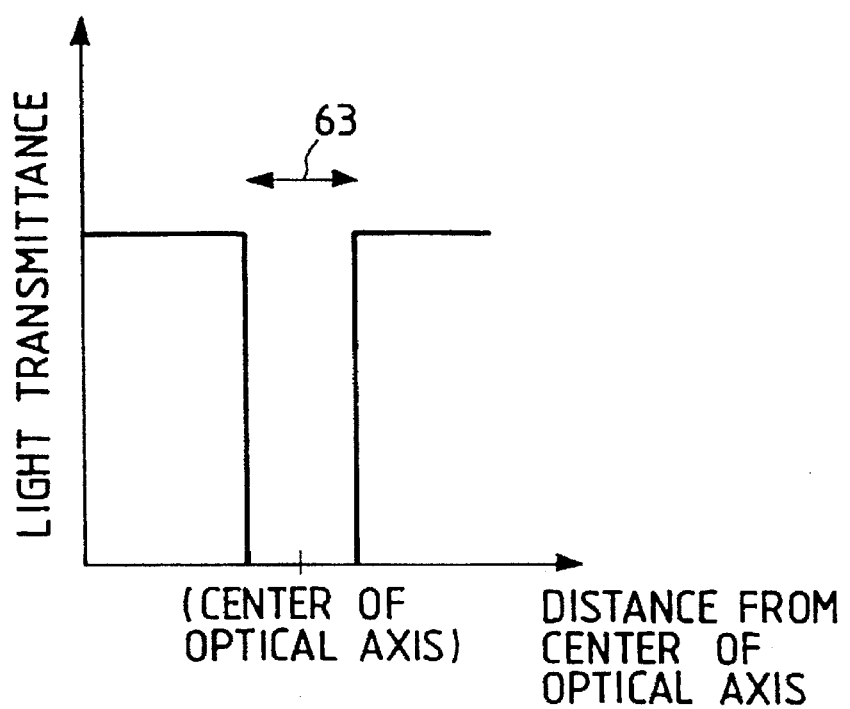
FIG. 2B is a graph showing the relationship between the light transmittance of the diffraction grating 6 and the distance from the center of the optical axis.

The diffraction grating 6 has aperture portions 61 and a shielding portion 62, as shown in FIG. 2A, and has a light transmission distribution shown in FIG. 2B. The diffraction grating 6 is arranged in a laser optical path between the collimator lens 3 and the polygonal mirror 4 as deflection means. A laser beam emerging from the collimator lens 3 is radiated onto a region X in FIG. 2A.

Figure 1A:
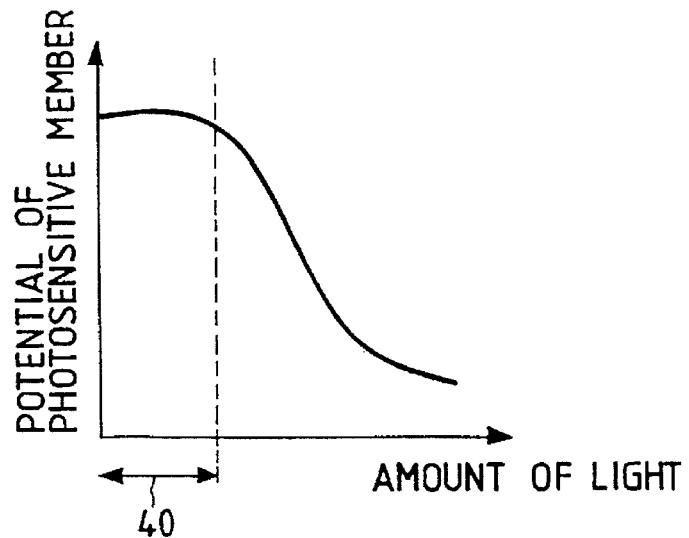
FIG. 1A is a graph showing the potential attenuation characteristics of a photosensitive member used in an embodiment of the present invention.
Figure 1B:
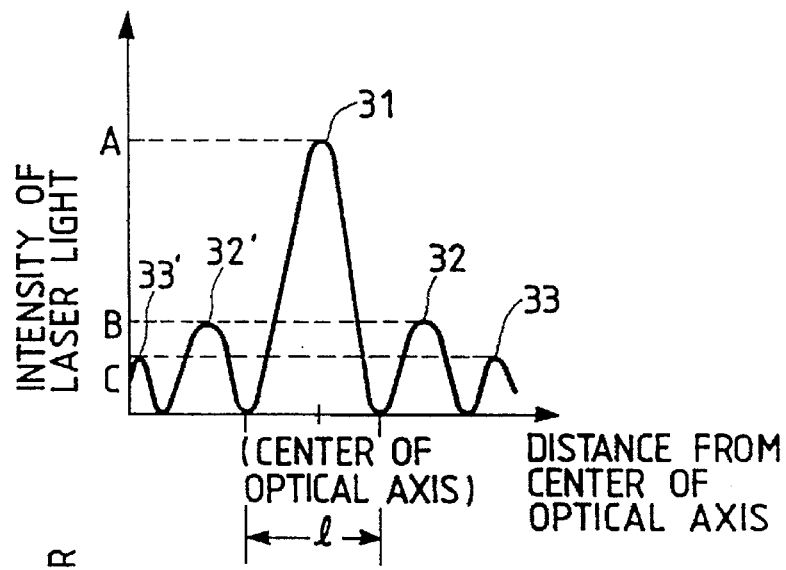
FIG. 1B is a graph showing the relationship between the intensity of laser light and the distance from the center of the optical axis.

A laser beam passing through the diffraction grating 6 is converted into a laser beam whose light intensity distribution has a plurality of peaks on the focusing surface on the image carrier due to the diffraction effect of the diffraction grating 6 having the aperture portions 61 and the shielding portion 62, as shown in FIG. 1B.

More specifically, the diffraction grating 6 converts a laser beam whose light intensity distribution in a section perpendicular to the optical axis direction of the laser beam has a single peak, into a laser beam whose light intensity distribution has a plurality of peaks.

As can be understood from FIG. 1B, a laser beam having a plurality of peaks has a maximum peak portion 31 (to be also referred to as a main lobe hereinafter) at the center of the section perpendicular to the optical axis direction. A light intensity distribution width l of this maximum peak portion 31 is smaller than that of a laser beam before being incident on the diffraction grating. Side lobes 32, 32', 33, 33', . . . having peak values B, C, . . . smaller than a peak value A of the maximum peak portion are present around the maximum peak portion 31.

The width of the shielding portion 62 in FIG. 2A is increased, whereby the width l of the main lobe 31 shown in FIG. 1B can be decreased. At the same time, however, the laser beam intensities of the side lobes 32, 32', 33, 33', . . . increase.

As described above, when the diffraction grating is arranged between the collimator lens and the deflection means, whereby the spot size can be decreased while not largely decreasing the light intensity of the laser beam. However, when a laser beam having a plurality of peaks shown in FIG. 1B is radiated onto the photosensitive member, light components of the side lobes 32, 32', 33, 33', and the like decrease the surface potential of the photosensitive member, and may form unnecessary images. In order to prevent this, this embodiment uses the photosensitive drum 10 as an image carrier having light amount-charging potential attenuation characteristics shown in FIG. 1A, thereby preventing attenuation of the potential caused by side lobes. In other words, this embodiment uses a photosensitive member having a photosensitive layer whose surface potential is attenuated by light of the main lobe of a laser beam having a plurality of peaks, and is not substantially attenuated by light components of the side lobes, thereby preventing the influence of the side lobes on the photosensitive member.

Figure 1C:
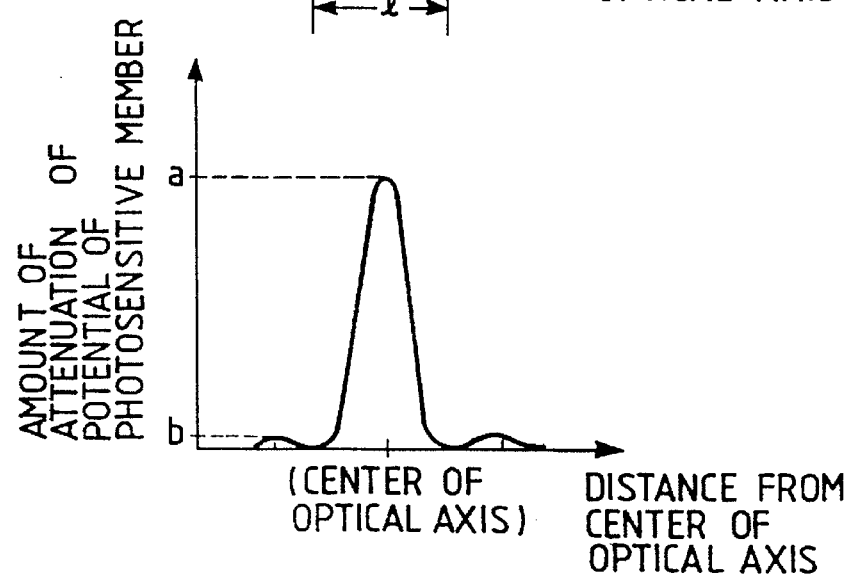
FIG. 1C is a graph showing the relationship between the amount of attenuation of the potential of the photosensitive member and the distance from the center of the optical axis.

Therefore, when the light amount distribution obtained by the laser light intensity distribution shown in FIG. 1B is superposed on the light amount-charging potential attenuation characteristics shown in FIG. 1A so as to set the peak values of the side lobes 32, 32', 33, 33', . . . to fall within a light amount range 40, the amount of attenuation of the side lobes 32, 32', 33, 33', . . . can be minimized, and the effect of the main lobe 31 is dominant in the potential attenuation distribution, as shown in FIG. 1C.

As a result, the beam spot size can be substantially decreased.

Note that a photosensitive member with characteristics that the potential is not almost attenuated for a small amount of light, and the amount of attenuation of the potential increases for a predetermined amount of light or more, as shown in FIG. 1A, is described in, e.g., Melin Schrfe, "Electrophotography Principles and Optimization", Research Studies Press Ltd., 1984. As described above, according to this embodiment, when the characteristics (FIG. 1A) of a photosensitive member which exhibits low sensitivity for a small amount of light are superposed on the laser light intensity characteristics (FIG. 1B) of a so-called super-resolution optical system, attenuation of the potential on the photosensitive member due to the side lobes 32, 32', 33, 33', . . . shown in FIG. 1B is prevented, and the beam spot size is decreased. As a result, a high-resolution beam spot latent image shown in FIG. 1C is formed, and an image with a higher resolution in digital electrophotography can be obtained.

As the range 40 with low sensitivity with respect to the laser beam to be radiated onto the photosensitive member becomes larger, side lobes which can be masked can assume larger peak values. Therefore, when a photosensitive member with a large range 40 is used, a width 63 of the shielding portion is increased, and the width l of the main lobe 31 can be decreased. Therefore, the possible setting ranges of the intensity of laser light and the width 63 of the shielding portion can be widened.

More specifically, since the sensitivity characteristics of the photosensitive member and the light amount distribution caused by diffraction can have various patterns depending on the manufacturing method and the like of the photosensitive member, the diffraction means, and the like, the charging potential, the intensity of laser light, and the like are adjusted to cause the peak values of the side lobes to fall with the sensitivity range 40 with a small amount of attenuation of the potential of the photosensitive member, so that a latent image formed by the main lobe becomes larger than latent images formed by the side lobes as much as possible, thereby minimizing the influence of the side lobes.

Thus, when the maximum amount of light of the main lobe light amount distribution is represented by A, the maximum amount of light of the side lobe light amount distribution is represented by B, the amount of attenuation of the surface potential obtained when the photosensitive member is exposed with light having the maximum peak A is represented by a, and the amount of attenuation of the surface potential obtained when the photosensitive member is exposed with light having a peak B other than the maximum peak value is represented by b, the intensity of laser light emitted from the light source, the width of the shielding portion, and the like are adjusted to satisfy:

$$(a/A) > (b/B)$$

Thus, a clear image with a high resolution can be formed on the photosensitive member.

It is preferable that not only the relation (a/A) >(b/B) be simply satisfied, but also (a/A)/(b/B) be larger.

When both the width and potential of a latent image are very small, since a force generated by a latent image charge is small, a toner supplied from a developing device is not influenced by a very small latent image upon development of the latent image. This is a known phenomenon in the electrophotography technique. Thus, as shown in FIGS. 7A and 7B, a method of controlling the developing characteristics by controlling the potential of removal of fog and the development contrast potential is also available. This method includes a method of inhibiting development of a small latent image by setting the potential of removal of fog which has a polarity opposite to that of a potential in a direction of development to be larger than the developing bias voltage which is applied to the developing device in image exposure (reverse development), a method of developing a small latent image by setting the development contrast potential which has the same polarity as that of the potential in the direction of development to be larger than the developing bias voltage which is applied to the developing device in background exposure (normal development), and the like.

Thus, when this method is used in the present invention to eliminate the influence of a small latent image formed by the side lobes on an image, even if a photosensitive member with the above-mentioned sensitivity characteristics is not used, the width of a latent image formed by the main lobe can be decreased using the above-mentioned laser beam diffraction means, thus attaining a high resolution.

In this case, since latent images formed by the side lobes are not eliminated by using the photosensitive member with the above-mentioned sensitivity characteristics, large side lobes cannot be set, and it is difficult to sufficiently decrease the width of the main lobe. Therefore, the effect of achieving a high resolution is limited as compared to the method using the photosensitive member with the above-mentioned sensitivity characteristics (for example, when the above-mentioned ratio (a/A)/(b/B) becomes smaller than unity, latent images formed by the slide lobes may be enlarged at a larger scale than a latent image formed by the main lobe as compared to the above-mentioned light amount distribution obtained by diffraction of the laser beam, and may appear as noise signals to neighboring pixels). Therefore, it is desirable in terms of realizing a high resolution to combine the method based on the laser beam diffraction means and the sensitivity characteristics of the photosensitive member with control of the potential of removal of fog and the development contrast.

(Other Embodiments)

Figure 5:
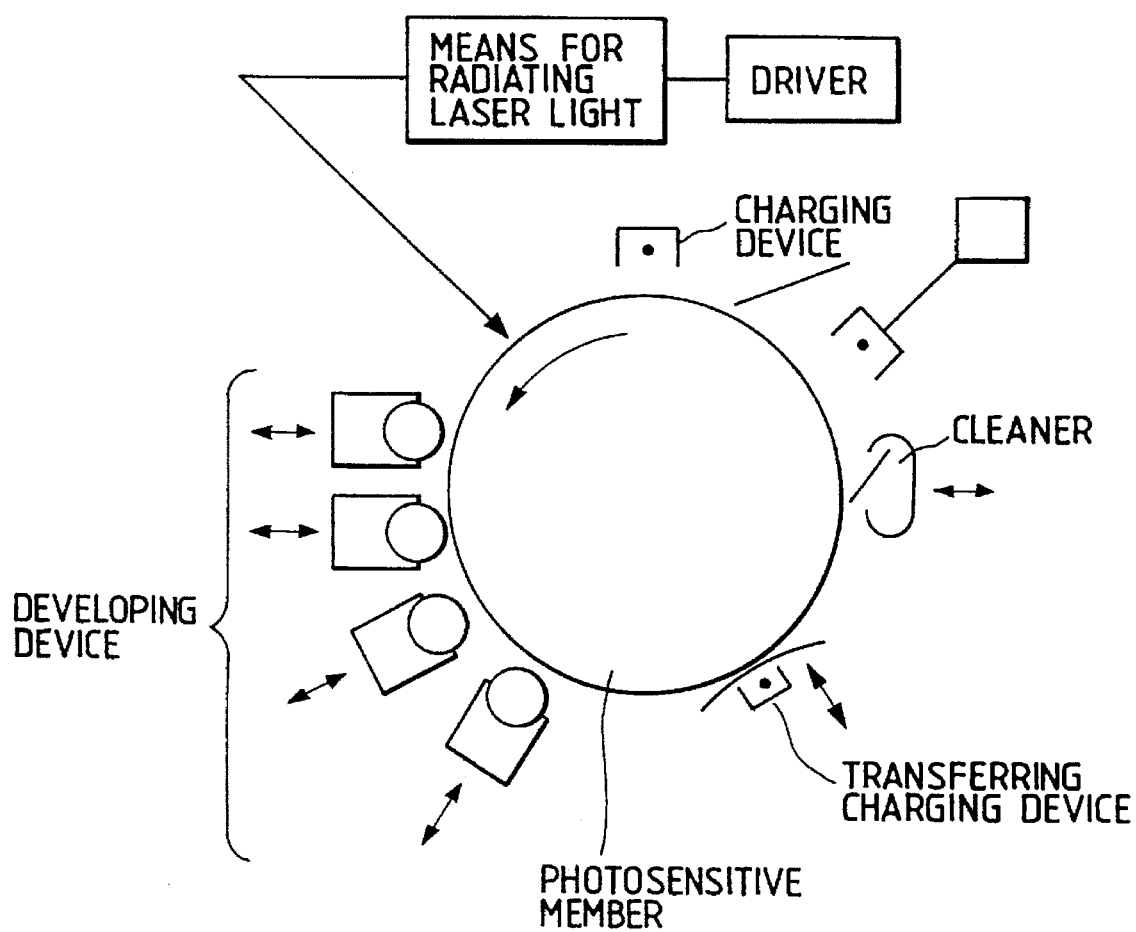
FIG. 5 is a schematic view showing an image forming apparatus of a multiple developing/simultaneous transferring electrophotography type, to which the laser light radiation device of the present invention can be applied.

As another embodiment, the present invention can be applied to a multiple developing/simultaneous transferring electrophotography method, as shown in FIG. 5. As the multiple developing/simultaneous transferring electrophotography method, in recent years, a multiple developing process for causing toner images to directly overlap each other on the photosensitive member or drum 10 to form a color image has been proposed. First, the surface of the photosensitive drum 10 is uniformly charged by a charging device 7. Thereafter, a latent image is written on the photosensitive drum 10 by exposure means, and only a portion irradiated with a laser beam is developed by reverse development. This process is repeated for three or four colors, e.g., magenta, cyan, yellow, and (black) to form toner images overlapping each other on the photosensitive drum 10, thereby forming a color image. The toner image is simultaneously transferred onto a paper sheet by a transferring charging device 8, and the residual charge on the photosensitive drum 10 is removed by a pre-exposure lamp.

Thereafter, the sheet with the toner image is supplied to a fixing device to fix the toner image, thus obtaining a color image.

As still another embodiment, FIG. 6 shows an example wherein the present invention is applied to a multiple drum method. In this embodiment, an image forming apparatus comprises a full-color laser beam printer. Unlike in the above embodiment, the printer comprises special-purpose image carriers in units of colors, i.e., photosensitive drums 10Y (yellow), 10M (magenta), 10C (cyan), and 10B (black), and special-purpose laser beam scanners 80Y, 80M, 80C, and 80B, developing devices 9Y, 9M, 9C, and 9B, transferring charging devices 11Y, 11M, 11C, and 11B, charging devices 13Y, 13M, 13C, and 13B, and cleaners 12Y, 12M, 12C, and 12B are arranged around the corresponding photosensitive drums.

A transfer sheet is fed in turn by paper supply rollers 15 and a paper supply guide 14' via a paper supply guide 14, and is corona-discharged by an attraction charging device 16. As a result, the transfer sheet is reliably attracted onto a feeding belt 18.

Thereafter, images formed on the respective photosensitive members are transferred onto the transfer sheet by the transfer charging devices 11Y, 11M, 11C, and 11B. Thereafter, the transfer sheet is discharged by a charge removal device 19 from the feeding belt 18. The images transferred onto the transfer sheet are fixed by a fixing device 17, thus obtaining a full-color image.

In this embodiment, in order to output a full-color image at high speed, a plurality of laser beam scanners and image carriers are arranged. The resolution of a dot becomes more important in this case than in the arrangements used in the above-mentioned embodiments due to limitations on mechanical precision and the like of each laser beam scanner, image carrier, and the like. Thus, when the resolution of a dot is increased by the method of the present invention, the above-mentioned problem can be solved more effectively.

In each of the above embodiments, a digital copying machine has been exemplified. As still another embodiment, the present invention may be applied to an image recording apparatus using a similar electrophotography process, e.g., a laser beam printer.

The present invention can be used in addition to the conventional image forming methods such as the PWM method, and to the prior arts including other electrophotography techniques.

Furthermore, in the embodiment of the present invention, the diffraction grating which has the shielding portion at the central portion in the optical axis direction has been exemplified as an element for realizing the super-resolution optical system. Also, a method of forming shielding portions axial-symmetrically from the center of the optical axis toward the peripheral portion, a method using light transmission plates which have spatially different light transmittances, a method using other phase or amplitude conversion elements may be used.

Since the present invention has the above-mentioned arrangement and effects, and the effective beam spot size is substantially decreased by diffraction of the diffraction grating, the area of a dot to be formed can be decreased without increasing the size and cost of the apparatus, and a very fine image can be carried on an image carrier.

Therefore, reproducibility of a high-resolution digital image can be improved, and a high-quality image can be obtained.

The present invention is not limited to the above-mentioned embodiments, and various other changes and modifications may be made within the spirit and scope of the invention.

What is claimed is:

1. A laser light radiation device comprising:

a light source for emitting laser light which is modulated according to an image signal;

a collimator lens for collimating the laser light emitted from said light source; and deflection means for deflecting laser light emerging from said collimator lens, wherein said device further comprises a diffraction grating in a laser optical path between said collimator lens and said deflection means, said diffraction grating reducing spot size of said laser light emerging from said collimator lens.

2. A device according to claim 1, wherein said laser light radiation device is a component of an electrophotography apparatus for forming an image defined in said image signal by radiating laser light emerging from said deflection means onto a photosensitive member.

3. A device according to claim 2, wherein said electrophotography apparatus further comprises charging means for charging said photosensitive member, and developing means for developing means an electrostatic latent image which is formed on said photosensitive member after said photosensitive member is irradiated with said laser light emerging from said deflection means.

4. A device according to claim 1, wherein said diffraction grating comprises a member for converting the laser light emerging from said collimator lens and having a light intensity distribution in a section perpendicular to an optical axis direction of the laser light and having a single peak, into laser light having a plurality of peaks.

5. A device according to claim 4, wherein said laser light having the plurality of peaks has a maximum peak at the center of the section perpendicular to the optical axis direction, and a width of a light intensity distribution of the maximum peak is smaller than a width of a light intensity distribution of the laser light before incidence thereof on said diffraction grating.

6. A device according to claim 3, wherein said diffraction grating comprises a member for converting laser light incident thereon and having a light intensity distribution in a section perpendicular to an optical axis direction of the laser light having a single peak into laser light having a plurality of peaks.

7. A device according to claim 6, wherein said laser light having the plurality of peaks has a maximum peak at the center of the section perpendicular to the optical axis direction, and a width of a light intensity distribution of the maximum peak is smaller than a width of a light intensity distribution of the laser light before incidence thereof on said diffraction grating.

8. A device according to claim 7, wherein said photosensitive member has a photosensitive layer in which a surface potential is attenuated by light of the maximum peak portion of said laser light having the plurality of peaks, and is not substantially attenuated by laser light having a peak other than the maximum peak.

9. A device according to claim 7, wherein when a light intensity of the maximum peak of said laser light having the plurality of peaks is represented by A, a laser light intensity of the peak other than the maximum peak is represented by B, an amount of attenuation of a surface potential obtained when said photosensitive member is exposed with the light having the maximum peak is represented by a, and an amount of attenuation of a surface potential obtained when said photosensitive member is exposed with said laser light having the peak other than the maximum peak is represented by b, said light source emits laser light having an amount of light satisfying:

(a/A)>(b/B).

* * * * *